F. E. WELLS.
TAP.
APPLICATION FILED FEB. 19, 1912.

1,046,518.

Patented Dec. 10, 1912.

WITNESSES:
H. L. Sprague
Harry M. Bowen

INVENTOR,
Frederic E. Wells
BY Chapin & Co.,
ATTORNEY.

COLUMBIA PLANOGRAPH CO., WASHINGTON, D. C.

UNITED STATES PATENT OFFICE.

FREDERIC E. WELLS, OF GREENFIELD, MASSACHUSETTS.

TAP.

1,046,518.  Specification of Letters Patent.  Patented Dec. 10, 1912.

Application filed February 19, 1912.  Serial No. 678,615.

*To all whom it may concern:*

Be it known that I, FREDERIC E. WELLS, a citizen of the United States of America, residing at Greenfield, in the county of Franklin and State of Massachusetts, have invented new and useful Improvements in Taps, of which the following is a specification.

This invention relates to improvements in taps and has especially to do with the manufacture or construction of the same, and involves more particularly the means for securing the cutting teeth to the stock or shank portion of the tap.

Broadly, the invention consists in casting the metal of the shank around the thread-cutting bars, the bars being so formed as to cause the same to be welded to the stock. Heretofore, it has been customary to construct taps from a single piece of metal, which is an expensive process.

My invention has, therefore, for one of its objects, the lessening of the cost of manufacture of this kind of machinist's tool without sacrificing any of the desirable qualities of the finished article. As the cutting bars are made from a fine quality of steel, it is not necessary that the material in which these bars are mounted or secured should be made of this expensive material. I have therefore perfected a tap in which the cutting bars are retained in place by making the stock of cast iron, or other suitable material, which becomes welded to the cutter-bars during the casting process.

Figure 1:
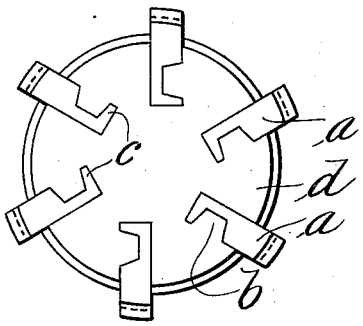
Figure 2:
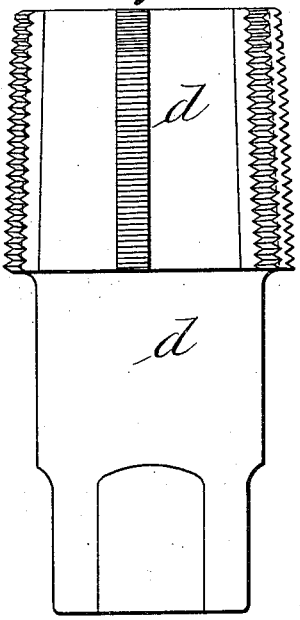

In the drawings forming part of this application,—Figure 1 is an end view of the finished tap showing the cutters held in place in the stock and illustrating the shape of the cutting-bars. Fig. 2 is a side view of the tap.

Referring to the drawings in detail,—$a$ designates the thread-cutting bars, the inner ends of which are provided with a groove or channel $b$ one side of which is formed with a comparatively thin rib or edge portion $c$. The grooving of these cutting bars, of course, lessens their weight and reduces the first cost of the material.

$d$ designates the stock or shank portion of the completed tap and is made of cast iron which flows around the cutter-bars $a$ during the casting process, in order to retain the same in place. By reason of the thin edge or border portion $c$ of the bars, this part of the bars is heated to a welding temperature by the molten metal during the process of casting the stock $d$ around the bars, thus welding together and thoroughly securing the cutting bars in place in the stock. Another advantage of channeling or forming the bars $a$ with a continuous groove is that this part of the tap may be purchased in long continuous bars from which desired lengths may be cut off for insertion in the stock. The grooving of the bar necessarily lessens the weight and cost of the bars, and at the same time permits the material composing the stock to be integrally secured thereto.

From the above description, it will be seen that I have produced a tap that is easily and cheaply constructed and one that is in all respects equal to any of those at present in use, as ordinarily constructed from one piece, as far as the operating qualities are concerned.

What I claim, is:—

A solid one piece tap comprising a plurality of steel cutting bars or members formed with a grooved shank-portion and a reduced rib-portion at the inner end of the shank-portion and designed to be permanently fused or welded with the holding material that is cast about the bars, whereby a solid one piece tap construction is formed as described.

FREDERIC E. WELLS.

Witnesses:
 OLIVE M. LONG,
 ARCHIBALD D. FLOWERS.

Copies of this patent may be obtained for five cents each, by addressing the "Commissioner of Patents, Washington, D. C."